United States Patent Office
3,763,286
Patented Oct. 2, 1973

3,763,286
CYANOPHENYL PHOSPHATES
Shigeo Kishino, Yasuo Yamada, Yoshio Kurahashi, and Toyohiko Kume, Tokyo, Japan, assignors to Bayer Aktiengesellschaft, Leverkusen, Germany
No Drawing. Filed Dec. 23, 1970, Ser. No. 101,138
Claims priority, application Japan, Dec. 30, 1969, 45/105,487
Int. Cl. A01n 9/36; C07f 9/12
U.S. Cl. 260—940                                    9 Claims

ABSTRACT OF THE DISCLOSURE

Cyanophenyl phosphates, i.e., optionally halogen-substituted o-cyanophenyl-O-lower alkyl - O - phenyl phosphates, which possess fungicidal properties, and which may be produced by reacting the corresponding phosphoric acid diester monohalide with cyanophenol or its salt.

---

The present invention relates to and has for its objects the provision of particular new cyanophenyl phosphates, i.e., optionally halogen-substituted o-cyanophenyl-O-lower alkyl-O-phenyl phosphates, which possess fungicidal properties, active compositions in the form of mixtures of such compounds with solid and liquid dispersible carrier vehicles, and methods for producing such compounds and for using such compounds in a new way especially for combating pests, e.g., fungi with other and further objects becoming apparent from a study of the within specification and accompanying examples.

From the specification of Japanese patent publication No. 18,393/63 it is known that O,O-dialkyl-O-(4-cyanophenyl) phosphates of the general formula

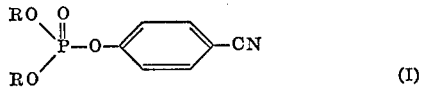

wherein R is an alkyl group, exhibit insecticidal activity and low toxicity to warm-blooded animals.

The present invention provides phosphoric acid esters of the general formula

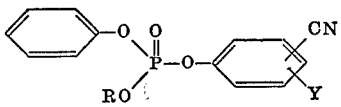

in which
R is an alkyl group, and
Y is a hydrogen or halogen atom.

The compounds of the Formula I exhibit high activity against a wide range of pathogenic fungi causing diseases of rice and other cultivated plants. Furthermore, these compounds have a low toxicity to warm-blooded animals and possess suitable compatibility with higher plants, that is, they do not show any phytotoxicity to higher plants at ordinary application concentrations. Accordingly, the compounds of this invention can be used advantageously as agricultural and horticultural fungicides for preventing and controlling diseases of plants caused by fungi.

The compounds of this invention can be used as fungicides for protecting plants from damage caused by Archimycetes, Phycomycetes, Ascomycetes, Basidiomycetes, Fungi Imperfecti and other fungi.

The active compounds of this invention can be applied for controlling pathogenic fungi living in the above-ground portions of plants; pathogenic fungi attacking plants from the soil and causing tracheomycosis; seed-borne pathogenic fungi; and soil-infectious pathogenic fungi.

The active compounds of this invention give good results when applied to diseases caused by those pathogenic fungi that hitherto have been controlled by fungicides containing heavy metals harmful to humans and domestic animals, such as arsenic and mercury. Further, they give particularly good results in controlling pathogenic fungi and bacteria causing diseases in rice plants. More particularly, these compounds exhibit excellent activity against *Piricularia oryzae* causing blast in rice plants and *Pellicularia sasakii* causing sheath blight, and they may be used for controlling these organisms at the same time. These compounds exhibit not only a preventive effect but also a curative effect, and hence their adaptability for concurrent control is enhanced.

The compounds of this invention exhibit controlling effects against fungi which infect rice plants and other agricultural plants such as *Xanthomonas oryzae* causing bacterial leaf blight on rice plants, *Ervinia aroideae* causing bacterial soft rot on Chinese cabbage, *Xanthomonas citri* causing canker on citrus fruits, *Cochliobolus miyabeanus* causing brown spot on rice plants, *Mycosphaerella musicola* causing leaf spot on bananas, *Botrytis cinerea* causing grey mould on strawberries and other plants, *Plasmopara viticola* causing downy mildew on grapes, *Glomerella cingulata* causing anthracnose on grapes, apples and pears, *Sclerotinia sclerotionum* causing stem rot on vegetables, *Collectotrichum lagenarium* causing anthracnose on melons, *Diaporthe citri* causing melanose on citrus fruits, *Podosphaera leucotricha* causing powdery mildew on apples. *Sphareotheca fuliginea* causing powdery mildew on cucumbers, *Alternaria mali* causing cork spot on apples, *Alternaria solani* causing early blight on potatoes, *Alternaria kikuchiana* causing black spot on pears, *Venturi inaequalis* causing scab on apples, *Venturia pirina* causing scab on pears, and the like.

The present invention also provides a process for the production of esters of the Formula I in which a phosphoric acid diester halide of the formula

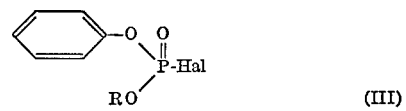

in which
R is the same as defined above, and
Hal is a halogen atom, preferably chlorine, is reacted with a phenol or phenolate of the formula

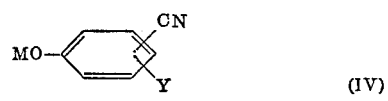

in which
M is a hydrogen atom, a metal equivalent or an ammonium group, and
Y is the same as defined above.

R in the above Formulae II and III is preferably a lower alkyl group such as methyl, ethyl, n- or iso-propyl, or n-iso-, sec-, or tert-butyl, especially methyl, ethyl or n-propyl.

Y stands for a hydrogen atom or a halogen atom such as fluorine, chlorine, bromine or iodine, especially for a hydrogen, chlorine or bromine atom.

M is preferably a hydrogen atom, an alkali metal atom, especially a sodium, potassium or lithium atom, or an ammonium group.

As suitable starting materials of the above Formula III there may be cited, by way of example, O-methyl-, O- ethyl- and O-n-propyl-, O-phenyl phosphoric acid diester chlorides.

As examples of the starting materials of the above Formula IV there may be cited 2-cyanophenol, 4-cyanophenol, 2-cyano-4-chlorophenol, 2-cyano-4-bromophenol and 2-chloro-4-cyanophenol, and salts of these phenols with ammonium or a metal such as sodium or potassium.

The synthesis of the active compounds of this invention is preferably carried out in the presence of a solvent or diluent; any inert solvent may be used for this purpose. However, particularly good results are attainable by use of aliphatic and aromatic hydrocarbons (which may be chlorinated), such as methylene chloride, di-, tri- and tetra-chloroethylenes, chloroform, carbon tetrachloride, benzine, benzene, chlorobenzene, toluene and xylenes. Also suitable are ethers such as diethyl- and di-n-butylethers, dioxane and tetrahydrofurane; low molecular weight aliphatic ketones and nitriles such as acetone, methylethylketone, methylisopropylketone, methylisobutylketone, acetonitrile and propionitrile; and low boiling aliphatic alcohols such as methanol and isopropanol; and the like.

The synthesis of the active compounds of this invention may be conducted in the presence of an acid-binder, especially when M is a hydrogen atom. Compounds which are normally used as acid-binders, for instance, hydroxides, carbonates, bicarbonates ad alcoholates of alkali metals and organic bases, in particular tertiary aliphatic aromatic and heterocyclic tertiary amines such as triethylamine, dimethylaniline and pyridine, may be used.

When the reaction is effected in the absence of an acid-binder, the intended product of high purity can be obtained in high yield by forming a salt, preferably an ammonium or alkali metal salt, of the appropriate phenol in advance and then reacting the salt with the appropriate phosphoric acid diester halide.

The reaction of the process of the invention may be carried out at temperatures within a broad range. Generally, however, the reaction is carried out at a temperature of from about −20° C. to the boiling point of the reaction mixture. Preferably, the reaction is effected at about 0° to 100° C. or the boiling point of the mixture, whichever is the lower. It is preferable to conduct the reaction under atmospheric pressure but it is possible to carry out the reaction under reduced or elevated pressure.

The process of the invention is illustrated in the following example.

EXAMPLE 1

11.9 of 2-cyanophenol and 10.1 g. of triethylamine were dissolved in 150 ml. of benzene, and 22.1 g. of O-ethyl-O-phenylphosphoryl chloride were added dropwise to the solution at 15°–20° C. with stirring. The stirring was continued for 1 hour at 20°–25° C. and for another hour at 60°–70° C. to complete the reaction. The reaction mixture liquor was cooled, washed with water, 1% hydrochloric acid and 1% aqueous sodium carbonate, and then dried over anhydrous sodium sulfate. Benzene was removed by distillation and then the reaction mixture was subjected to distillation under reduced pressure to obtain 20.8 g. of a colorless oily liquid, namely O-ethyl-O-phenyl-O-(2-cyanophenyl) phosphate of the formula

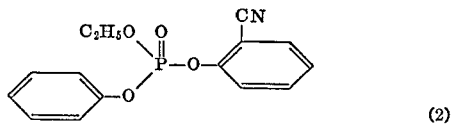

(2)

The product was characterized by a boiling point of 154° C./0.1 mm. Hg and a refractive index $n_D^{20}$ of 1.5354.

The following compounds could be prepared by an analogous method.

TABLE 1

| Compound number | Formula | Physical properties Boiling point, ° C./mm. Hg | (Refractive index) |
|---|---|---|---|
| (1) | CH₃O, C₆H₅O–P(=O)–O–C₆H₄(CN) (ortho) | — | ($n_D^{20}$ 1.5530) |
| (3) | C₂H₅O, C₆H₅O–P(=O)–O–C₆H₃(CN)(Cl) | 162/0.1 | ($n_D^{20}$ 1.5451) |
| (4) | C₂H₅O, C₆H₅O–P(=O)–O–C₆H₄–CN (para) | 155–160/0.06 | ($n_D^{20}$ 1.5348) |
| (5) | C₂H₅O, C₆H₅O–P(=O)–O–C₆H₃(Cl)(CN) | 168/0.1 | ($n_D^{20}$ 1.5482) |
| (6) | C₂H₅O, C₆H₅O–P(=O)–O–C₆H₃(CN)(Br) | 184/0.03 | ($n_D^{20}$ 1.5595) |
| (7) | n-C₃H₇O, C₆H₅O–P(=O)–O–C₆H₄(CN) | 177–180/0.12 | ($n_D^{20}$ 1.5350) |

The active compounds according to the instant invention can be utilized, if desired, in the form of the usual formulations or compositions with conventional inert (i.e. plant compatible or herbicidally inert) pesticide diluents or extenders, i.e., diluents or extenders of the type usable in conventional pesticidal formulations or compositions, e.g. conventional pesticide formulation or composition such as solutions, emulsions, suspensions, emulsifiable concentrates, spray powders, pastes, wettable powders, soluble powders, oil preparations, aerosol preparations, dusting agents, coated particles, tablets, granules, pellets, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, dimethylnaphthalene, aromatic naphthas, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, carbon tetrachloride, chloroethylene, etc.), cyclohexane, alcohols (e.g. methanol, ethanol, propanol, butanol, etc.), amines (e.g. ethanolamine, etc.), ethers, ether-alcohols (e.g. glycol monomethyl ether, etc.), ketones (e.g. acetone, methylethylketone, cyclohexanone, etc.), strongly polar solvents such as acetonitrile, amides such as dimethyl formamide, sulfoxides (e.g. dimethyl sulfoxide, etc.); and/or water; as well as inert dispersible finely divided solid carriers, such as ground natural minerals (e.g. kaolins, attapulgite, clays, montmorillonite, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.; as well as gaseous diluents or carriers such as Freon and other aerosol propellants which are gaseous under normal conditions.

Such active compounds may be employed alone or in the form of mixtures with one another and/or with such solid and/or liquid dispersible carrier vehicles and/or other known compatible active agents, especially plant protection agents, such as acaricides, insecticides, nematocides, rodenticides, plant growth-regulating agents, or fungicides (including antibiotic substances), herbicides, bactericides, etc., as well as fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.01–5%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, generally about 15 to 1000 g. per hectare, preferably about 40 to 600 g. per hectare, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. fungi and more particularly, methods of combating at least one of fungi which comprises applying to at least one of correspondingly (a) such fungi, and (b) the correspondingly habitat, i.e. the locus to be protected, a correspondingly combative or toxic amount, i.e. fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, injecting, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples in which the active compounds are identified by the numbers given to them in Example 1 and Table 1.

EXAMPLE 2

15 parts by weight of compound (2) of Example 1, 80 parts by weight of diatomaceous earth and 5 parts by weight of an emulsifier (i.e. polyoxyethylene alkylaryl ether) are mixed and crushed to prepare a wettable powder. This formulation may be diluted with water to the desired concentration and then be used as a ready-to-use preparation.

EXAMPLE 3

30 parts by weight of compound (5) of Table 2, 30 parts by weight of xylene, 30 parts by weight of Kawakasol (an aromatic hydrocarbon with a boiling range of 150 to 200° C.) and 10 parts by weight of the emulsifier Sorpol (i.e. polyoxyethylenealkylaryl ether) are mixed and stirred to prepare an emulsifiable concentrate (an emulsifiable liquor). This formulation may be diluted with water to the desired concentration and then used as a ready-to-use preparation.

EXAMPLE 4

To a mixture consisting of 10 parts by weight of compound (6) of Table 2, 10 parts by weight of bentonite, 78 parts by weight of a mixture of talc and clay (1:3) and 2 parts by weight of lignin sulfate, 25 parts by weight of water are added and the mixture is firmly kneaded.

It is finely cut into granules of 0.5 to 1.5 mm. diameter by means of a granulating machine. The granules are then dried at a temperature between 40 to 50° C. to obtain a granular formulation. This formulation may directly be applied to the soil.

EXAMPLE 5

2 parts by weight of compound (3) of Table 2 and 98 parts by weight of a mixture of talc and clay (1:3) are mixed and crushed to prepare a dust. This formulation may directly be used as a ready-to-use preparation.

When the compounds of this invention are compared with known compounds of an analogous structure and compounds having analogous biological activity, the compounds of this invention unexpectedly exhibit substantially improved effects and a very low toxicity to warm-blooded animals. Accordingly, the novel compounds of this invention are of great utility.

The effectiveness of the compounds of this invention is illustrated in the following examples.

EXAMPLE 6

Test on rice blast (*Piricularia oryzae*)/(pot test)

Preparation of sample chemical liquor:
  Solvent: 1 part by weight of acetone.
  Dispersing agent: 0.05 part by weight of sodium oleate.
  Other additive: 0.2 part by weight of gelatin.
  Water: 98.75 parts by weight.

A concentrated emulsifiable liquor (obtained by adding the active compound in an amount sufficient to obtain the prescribed concentration to the above amount of the solvent) was admixed with the above amount of water containing the above amounts of the dispersing agent and gelatin.

Test procedures.—(a) Test of preventive effect and the durability of effect (residual effect): Rice plant (jukkoku variety) was cultivated in a pot of 12 cm. diameter and the above-mentioned diluted liquor containing the active compound of this invention at the prescribed concentration was applied to the rice plant in an amount of 50 ml. per 4 pots.

One half of the chemical-sprayed rice plant was kept in a chamber maintained at 25° C. and a relative humidity of 100% for 2 days from the next day after the chemical spraying, and the remaining half was kept in the same chamber for 2 days from the fourth day after the chemical spraying. While in the chamber, the rice plant was twice inoculated by spraying with a suspension of spores of artificially cultured pathogenic fungi of blast. From the results of the infection made the next day after the chemical spraying, the preventive effect can be evaluated, and from the results of the infection made the fourth day after the chemical spraying, the durability of the preventive effect (residual effect) can be ascertained.

Seven days after inoculation, the degree of infestation was determined by applying a scale ranging from 0 to 5, and the protective value of each particular active compound against *Piricularia oryzae* was determined in accordance with the formula below.

At the same time, the phytotoxicity against rice plants was determined.

| Degree of infestation: | Infester area of leaf in percent of total leaf |
|---|---|
| 0 | 0 |
| 0.5 | 0–2 |
| 1 | 2–5 |
| 2 | 5–10 |
| 3 | 10–20 |
| 4 | 20–40 |
| 5 | 40 or more |

Protective value=100

$$\frac{\text{Degree of infestation of treated plants}}{\text{Degree of infestation of non-treated plants}} \times 100$$

TABLE 2.—RESULTS OF TESTS OF EFFECTS AGAINST RICE BLAST

| Compound No. | Structure | Active compound concentration, p.p.m. | Protective value [1] Preventive effect | Protective value [1] Residual effect | Phytotoxicity [4] |
|---|---|---|---|---|---|
| (1) | $CH_3O$, $C_6H_5O$–P(=O)–O–$C_6H_4$–CN | 250 / 500 | 100 / 100 | 82 / 96 | — |
| (2) | $C_2H_5O$, $C_6H_5O$–P(=O)–O–$C_6H_4$–CN | 250 / 500 | 100 / 100 | 86 / 100 | — |
| (3) | $C_2H_5O$, $C_6H_5O$–P(=O)–O–$C_6H_3$(CN)(Cl) | 250 / 500 | 100 / 100 | 75 / 94 | — |
| (4) | $C_2H_5O$, $C_6H_5O$–P(=O)–O–$C_6H_4$–CN | 250 / 500 | 96 / 100 | 66 / 88 | — |
| (5) | $C_2H_5O$, $C_6H_5O$–P(=O)–O–$C_6H_3$(Cl)(CN) | 250 / 500 | 100 / 100 | 67 / 90 | — |
| (6) | $C_2H_5O$, $C_6H_5O$–P(=O)–O–$C_6H_3$(CN)(Br) | 250 / 500 | 100 / 100 | 76 / 88 | — |

See footnotes at end of table.

TABLE 2—Continued

| Compound No. | | Active compound concentration, p.p.m. | Protective value [1] | | Phyto- toxicity [4] |
| --- | --- | --- | --- | --- | --- |
| | | | Preventive effect | Residual effect | |
| (7) | n-C₃H₇O\P(=O)(—O—C₆H₅)—O—C₆H₄—CN | 250 | 96 | 62 | — |
| | | 500 | 100 | 82 | — |
| (A) [2] | C₂H₅O\P(=O)(OC₂H₅)—O—C₆H₄—CN | 250 | 12 | 0 | — |
| | | 500 | 36 | 0 | — |
| | (Comparison) | | | | |
| (B) [3] | i-C₃H₇O\P(=O)(Oi-C₃H₇)—S—CH₂—C₆H₅ | 480 | 85 | 42 | — |
| | (Comparison) | | | | |
| Untreated (control) | | | 0 | 0 | — |

[1] Preventive effect means that the inoculation with the pathogenic fungi of blast was effected 1-2 days after the chemical application. Residual effect means that the inoculation with the pathogenic fungi of blast was effected 4-5 days after the chemical application.
[2] Comparison (A) is disclosed in the specification of Japanese patent publication No. 18,398/63.
[3] Comparison (B) is commercially available.
[4] The symbol "—" in column "Phytotoxicity" means that the chemical did not adversely affect the growth of the rice plant.

EXAMPLE 7

Test of effects against sheath blight (*Pellicularia sasakii*)/(pot test)

Test procedures.—Rice plant (Kinmaze variety) was cultivated in a 12 cm. diameter pot, and in the beginning of the tellering stage the diluted liquor containing the active compound at the prescribed concentration, which was prepared in the same manner as in Example 6, was applied to the rice plant in an amount of 50 ml. per 3 pots.

The next day, the root of the sample rice plant was inoculated with pathogenic fungi of sheath blight which had been cultured in a barley culture medium for 10 days and in which sclerotia had been formed. Then the sample was kept in an inoculation chamber maintained at 28°–30° C. and a relative humidity of more than 95% for 8 days. The degree of the disease was examined.

The degree of infestation was determined by means of the Formula 1 and the protective value of each compound was calculated in accordance with the Formula 2:

$$\text{Degree of infestation} = \frac{3 \cdot n_3 + 2 \cdot n_2 + 1 \cdot n_1 + 0 \cdot n_0}{3 \cdot N} \times 100 \quad (1)$$

wherein $N$ = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom).

Protective value = 100

$$- \frac{\text{Degree of infestation of treated plants}}{\text{Degree of infestation of non-treated plants}} \times 100 \quad (2)$$

TABLE 3.—RESULTS OF TEST ON SHEATH BLIGHT

| Compound No. | | Active compound concentration, p.p.m. | Protective value |
| --- | --- | --- | --- |
| (2) | C₂H₅O\P(=O)(—O—C₆H₅)—O—C₆H₄—CN | 500 | 68 |
| (5) | C₂H₅O\P(=O)(—O—C₆H₅)—O—C₆H₃(Cl)—CN | 500 | 65 |
| (A) | C₂H₅O\P(=O)(OC₂H₅)—O—C₆H₄—CN | 500 | 31 |
| | (Comparison) | | |
| Untreated (control) | | | 0 |

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:
1. Phosphoric acid esters of the formula

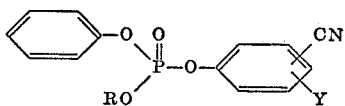
(II)

in which
R is a lower alkyl group, and
Y is a hydrogen or halogen atom, the —CN and Y substituents being located in the 2- and 4-positions.
2. Esters according to claim 1 in which Y is a hydrogen, chlorine or bromine atom.
3. The ester according to claim 1 wherein such ester is O-methyl-O-phenyl-O-(2-cyanophenyl) phosphate of the formula

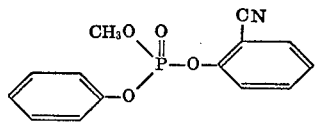
(1)

4. The ester according to claim 1 wherein such ester is O-ethyl-O-phenyl-O-(2-cyanophenyl) phosphate of the formula

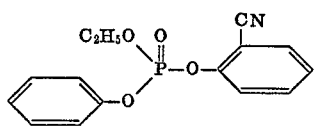
(2)

5. The ester according to claim 1 wherein such ester is O-ethyl-O-phenyl-O-(4-cyanophenyl) phosphate of the formula

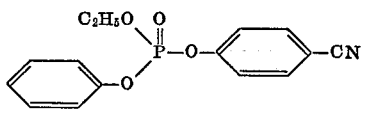
(4)

6. The ester according to claim 1 wherein such ester is O-ethyl-O-phenyl-O-(2-chloro-4-cyanophenyl) phosphate of the formula

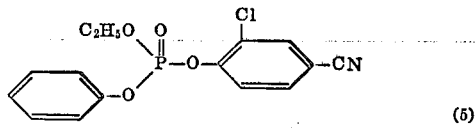
(5)

7. The ester according to claim 1 wherein such ester is O-n-propyl-O-phenyl-O-(2-cyanophenyl) phosphate of the formula

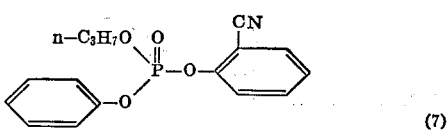
(7)

8. The ester according to claim 1 wherein such ester is O-ethyl-O-phenyl-O-(2-cyano-4-chlorophenyl) phosphate of the formula

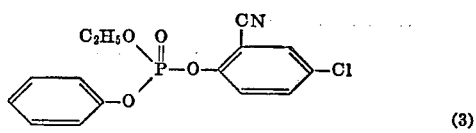
(3)

9. The ester according to claim 1 wherein such ester is O-ethyl-O-phenyl-O-(2-cyano-4-bromophenyl) phosphate of the formula

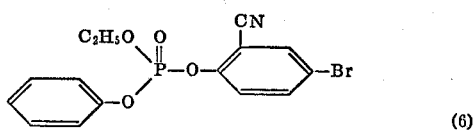
(6)

References Cited
UNITED STATES PATENTS
3,250,826   5/1966   Tamara et al. _____ 260—940

LEWIS GOTTS, Primary Examiner
A. H. SUTTO, Assistant Examiner

U.S. Cl. X.R.
424—210